(12) United States Patent
Marriott

(10) Patent No.: US 10,113,136 B2
(45) Date of Patent: Oct. 30, 2018

(54) FRACTIONATION OF FRANKINCENSE RESIN USING SUPERCRITICAL CARBON DIOXIDE

(71) Applicant: Phytovation Ltd, Gwynedd (GB)

(72) Inventor: Raymond Marriott, Northhamptonshire (GB)

(73) Assignee: PHYTOVATION LTD, Gwynedd (GB)

( * ) Notice: Subject to any disclaimer, the term of this patent is extended or adjusted under 35 U.S.C. 154(b) by 101 days.

(21) Appl. No.: 15/513,381

(22) PCT Filed: Sep. 28, 2015

(86) PCT No.: PCT/EP2015/072296
§ 371 (c)(1),
(2) Date: Mar. 22, 2017

(87) PCT Pub. No.: WO2016/050712
PCT Pub. Date: Apr. 7, 2016

(65) Prior Publication Data
US 2018/0230400 A1  Aug. 16, 2018

(30) Foreign Application Priority Data

Sep. 30, 2014 (EP) ..................... 14187216

(51) Int. Cl.
*B01D 11/02* (2006.01)
*C11B 9/02* (2006.01)
*C11B 9/00* (2006.01)

(52) U.S. Cl.
CPC .......... *C11B 9/025* (2013.01); *B01D 11/0203* (2013.01); *B01D 11/0284* (2013.01); *C11B 9/0042* (2013.01)

(58) Field of Classification Search
CPC .............................. C11B 9/025; B01D 11/023
USPC ......................................................... 554/101
See application file for complete search history.

(56) References Cited

FOREIGN PATENT DOCUMENTS

| GB | 2119399 A | 11/1983 |
|----|-----------|---------|
| WO | 02074886 A1 | 9/2002 |

OTHER PUBLICATIONS

Marongui et al., "Extraction of Santalum album and Boswellia carterii Birdw. volatile oil by supercritical carbon dioxide: influence of some process parameters", Flavour and Fragrance Journal, 2006, vol. 21, pp. 718-724.*

(Continued)

*Primary Examiner* — Deborah D Carr
(74) *Attorney, Agent, or Firm* — RatnerPrestia

(57) ABSTRACT

A method for extracting successively essential oil, incensole derivatives and boswellic acids from frankincense resin.

8 Claims, 6 Drawing Sheets

(56) References Cited

OTHER PUBLICATIONS

International Search Report and Written Opinion for International Application No. PCT/EP2015/072296, dated Feb. 2, 2016—8 Pages.
Buchele et al., "Analysis of pentacyclic triterpenic acids from frankincense gum resins and related phytopharmaceuticals by high-performance liquid chromatography. Identification of lupeolic acid, a novel pentacyclic triterpene", 2003, Journal of Chromatography B, vol. 791(1), pp. 21-30.
Dekebo et al., "Volatile Oils of Frankincense From Boswellia Papyrifera", 1999, Bulletin of the Chemical Society of Ethiopia, vol. 13, No. 1. pp. 93-96.
Zhou et al., "Parameters optimization fo supercritical fluid-$CO_2$ extracts of frankincense using resposne surface methodology and its pharmacodynamics effects", J. Sep. Sci., 2013, vol. 36, pp. 383-390.

\* cited by examiner

US 10,113,136 B2

FRACTIONATION OF FRANKINCENSE RESIN USING SUPERCRITICAL CARBON DIOXIDE

RELATED APPLICATION

This application is a U.S. National Phase Application of PCT International Application PCT/EP2015/072296, filed on Sep. 28, 2015, which claims priority to European Patent Application EP 14187216.8, filed on Sep. 30, 2014, each incorporated by reference herein.

FIELD OF THE INVENTION

This invention discloses a method for extracting successively several compounds from frankincense resin.

BRIEF DESCRIPTION OF THE PRIOR ART

Frankincense is an aromatic resin obtained from trees of the genus *Boswellia*. It has been used in religious and cultural ceremonies for centuries. In addition, it has several well established and documented medical properties such as, for example, in the treatment of inflammatory conditions, in cancerous conditions. It also accelerates wound healing and has antimicrobial activity.

Frankincense contains 3 to 8 wt % of volatile oil, 60 to 70 wt % of resin, 27 to 35 wt % of gum and some other ingredients. In recent years, several methods have been developed in order to extract the active components from the resin.

Conventional processes include distillation such as disclosed for example by Dekebo et al. (Dekebo, Aman, Medihn Zewdu, and Ermias Dagne. (1999). Bulletin of the Chemical Society of Ethiopia 13.1. 93-96) incorporated by reference herein and, solvent extraction such as disclosed for example by Büchele et al. (Büchele, B., Zugmaier, W., & Simmet, T. (2003). Journal of Chromatography B, 791(1), 21-30) incorporated by reference herein, but such methods may require the additional step of separating the extractant in the case of solvent extraction, or may suffer from the disadvantage of thermal degradation in the case of distillation.

In order to overcome these disadvantages, extraction methods have been developed using both liquid and supercritical carbon dioxide. Carbon dioxide is safe, non-toxic, non-combustible, inexpensive and its critical temperature and pressure are respectively 31.06° C. and 7.3825 MPa, thus reasonably low. In addition, many compounds are readily soluble in both liquid and supercritical carbon dioxide.

In a recent publication, Marongiu et al. (Marongiu B., Piras A., Porcedda S., Tuveri E., in Flavour Fragr. J. 2006, 21, 718-724) incorporated by reference herein have disclosed the extraction of *Santalum album* and *Boswellia carterii*Birdw. volatile oil using supercritical carbon dioxide. They have compared the efficiency of their method with that of traditional hydrodistillation extraction and shown the far better efficiency of supercritical carbon dioxide.

In another publication by Zhou et al. (Zhou J., Ma X., Qiu B., Chen J., Bian L., Pan L., in J. Sep. Sci., 2013, 36, 383-390) incorporated by reference herein the authors have used response surface methodology to optimise temperature, pressure and time parameters in the supercritical carbon dioxide extraction of frankincense.

There is however room for progress and improvement in the efficient extraction of other compounds from frankincense resin.

SUMMARY OF THE INVENTION

An aspect of the present invention is to sequentially separate several compounds from frankincense resin.

It is also an aspect of the present invention to fractionate frankincense resin using a strictly 'green' process.

It is another aspect of the present invention to use carbon dioxide both as liquid and as supercritical carbon dioxide as solvent in the fractionation of frankincense resin.

It is yet another aspect of the present invention to use carbon dioxide both as liquid and as supercritical carbon dioxide together with a co-solvent as solvent in the fractionation of frankincense resin.

It is a further aspect of the present invention to produce essential oil, incensole derivatives and boswellic acid from frankincense resin using a 'green' method.

DETAILED DESCRIPTION OF THE INVENTION

Figure 1:
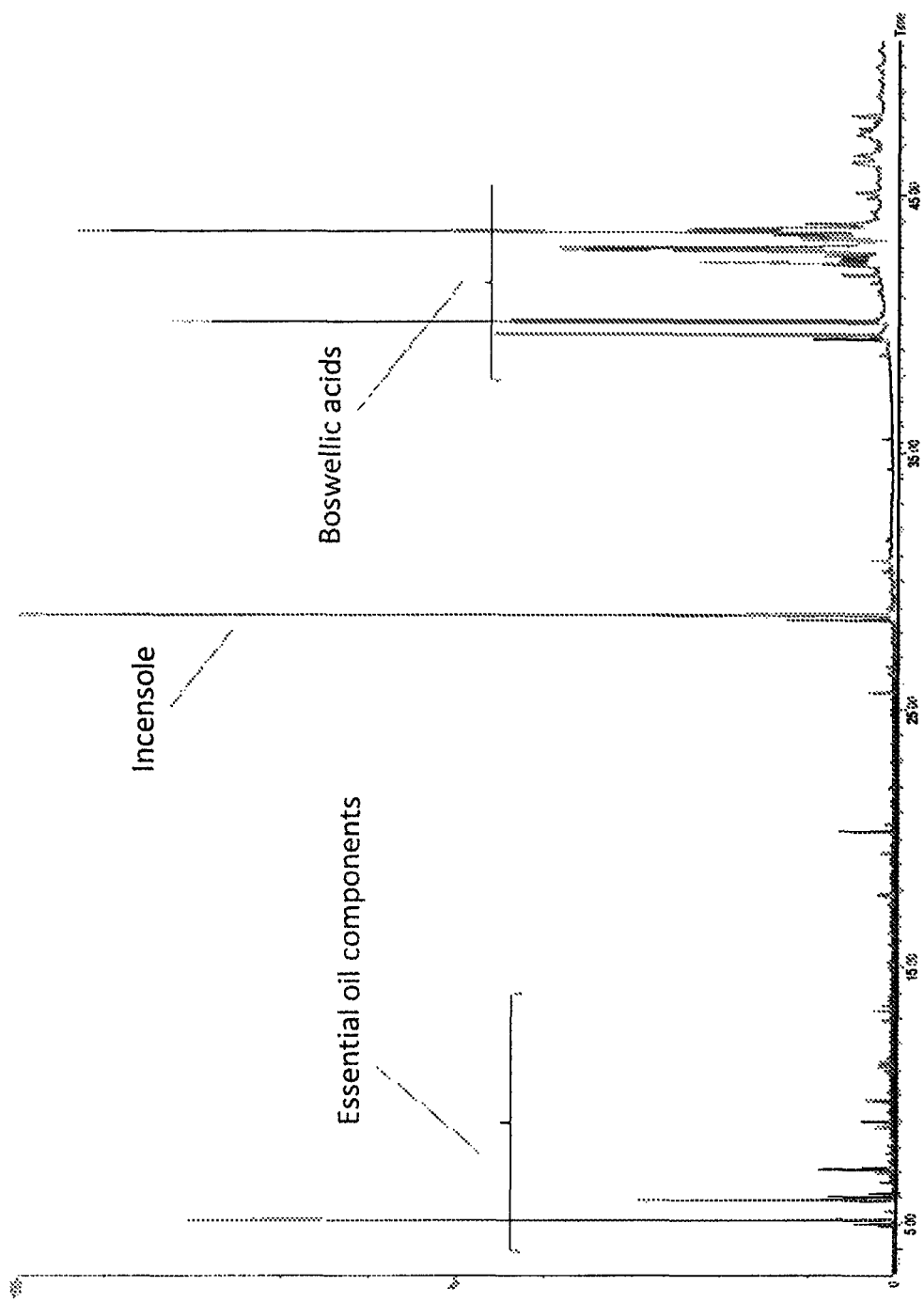
FIG. 1 represents a typical gas chromatogram of a whole extract from *Boswellia carteri* with the main components indicated

Accordingly, an aspect of the present invention discloses a method for sequentially extracting essential oil, incensole derivatives and boswellic acid from frankincense resin, said method comprising the steps of:
a) grinding the frankincense resin;
b) separating a first fraction of essential oil with liquid carbon dioxide at a first temperature ranging between 0° C. and 30° C. and a first pressure ranging between 40 bars and 73.8 bars or with mild supercritical carbon dioxide, and with a first flow rate ranging between 10 g and 400 g/kg ground material/min until no further essential oil can be recovered or the extract yield falls below 0.1% of starting mass per hour;
c) retrieving essential oil from the separator;
d) separating a second fraction of incensole with supercritical carbon dioxide at a second temperature ranging between 31° C. and 100° C. and a second pressure of at least 72.8 bars and a second flow rate ranging between 10 g and 400 g/kg ground material/min until no further incensole or its derivatives can be recovered or the extract yield falls below 0.1% of starting mass per hour;
e) retrieving incensole derivatives from the separator;
f) optionally, continuing the separation process with supercritical carbon dioxide at other sets of increasing temperature and/or pressure until further desired fractions are separated;

g) separating a further fraction of boswellic acid with supercritical carbon dioxide at a temperature of at least 31° C. and a pressure of at least 72.8 bars and a flow rate ranging between 10 g and 400 g/kg ground material/min using a co-solvent at a level ranging between 0.05 vol % and 50.0 vol % of the $CO_2$ flowrate until complete separation of boswellic acids is achieved or it is determined that no further materials can be extracted or the extract yield falls below 0.1% of starting mass per hour;

h) retrieving boswellic acid from the separator and removing the co-solvent by evaporation or distillation;

i) optionally, continuing the separation process with supercritical carbon dioxide at another set of temperature and pressure and co-solvent until all desired fractions are separated;

j) retrieving the remaining unseparated residues.

If the first extraction of step b) is carried out under mild supercritical conditions, the temperature and/or pressure are lower than those used in step d).

In step g), it is determined that no further material can be extracted by collecting and analysing the co-solvent using direct injection into liquid chromatography-mass spectroscopy (LC-MS), said process taking about 2 minutes. The extraction is ended when the extract yield falls below 0.1% of starting mass per hour.

The starting frankincense resin material is obtained from any *Boswellia* species, including but not exclusively, *B. ameero, B. boranensis, B. bricchettii, B. bullata, B. carteri, B. chariensis, B. dalzielii, B. dioscoridis, B. elegans, B. elongata, B. frereana, B. globosa, B. hildebrandtii, B. holstii, B. madagascariensis, B. microphylla, B. multifoliolata, B. nana, B. neglecta, B. occidentalis, B. ogadensis, B. ovalifoliolata, B. papyrifera, B. pirottae, B. popoviana, B. rivae, B. sacra, B. serrata* and *B. socotrana*.

The grinding process is carried out by using any suitable mill, preferably with a 3-5 mm screen.

The liquid carbon dioxide used in the first separation is used at a temperature ranging between 0 and 30° C., preferably between 5 and 20° C., at a pressure ranging between 50 and 73 bars, preferably between 60 and 70 bars with a flow rate ranging between 10 g and 400 g/kg ground material/min, preferably between 50 and 100 g/kg ground material/min and a period of time ranging between 5 minutes and 300 minutes preferably between 30 and 120 minutes.

For the subsequent separations using carbon dioxide, the temperature and pressure are selected to separate the desired compounds, using increasingly polar conditions.

Above the supercritical point, the temperature and pressure are selected and adjusted to fractionate the desired range of molecules. In the present method, the temperature is preferably selected between 30 and 50° C., the pressure between 200 and 500 bars and the flow rate between 50 and 100 g/kg ground material/min.

The supercritical carbon dioxide can further include a percentage of co-solvent, preferably ethanol. This leads to distinctly different separation products. The percentage of added co-solvent ranges between 0.05 vol % and 50.0 vol % of the $CO_2$ flowrate, preferably between 5 and 15 vol % of the $CO_2$ flowrate.

Another advantage of using supercritical carbon dioxide as fractionation and extraction solvent is that it can be easily removed because of its 'zero' surface tension, thereby producing solvent-free products.

The 'green' solvents are selected from water, ethanol and carbon dioxide.

An aspect of present invention also discloses the products obtained by the method of the present invention. Because the present products have been obtained without solvents they do not suffer from the disadvantage of containing traces of solvents.

EXAMPLES

*Boswellia* resins were obtained from Asli Maydi Exports for example 1 and from Juniper Global Ltd for example 2, and liquid $CO_2$ was obtained from BOC. The ethanol used was fermentation grade absolute ethanol obtained from Fisher.

Extraction trials were carried out on a Thar SFC-1000 extraction rig using, a 100 ml extractor. Subsequent trials were made using a 2×16 litre extractor manufactured by Separex SA to obtain larger samples of the fractions.

Extraction was carried out as follows: the chillers were set at a temperature of 0° C. for the $CO_2$ pump and at a temperature of +5° C. for the cold trap. Approximately 60 g of the milled *Boswellia* resin was loaded into the 100 ml extractor and firmly pressed down. The cylinder inlet pressure was set to 50-52 bar using manual back pressure regulator (BPR) on $CO_2$ inlet line, the inline heater and extractor heater were switched on and the separator was heated to 35° C.

The first extraction was carried out with liquid $CO_2$ at 10° C. and 65 bar with a flow rate of 10 g/min. Once pressure had been reached, the separator was adjusted to 15 bar back pressure and samples were collected every 15 minute, until the 15 min fraction weight was below 0.1 g. When the last sample was collected, the cold trap was drained.

In the subsequent extraction using Supercritical $CO_2$, the automated back pressure regulator (ABPR) was set to 400 bar and the extractor temperature was increased to 50° C. Once temperature was reached, $CO_2$ was turned on at a flow rate of 10 g/minute and once the pressure had been reached the separator was adjusted to 15 bar back pressure and samples were collected every 15 minute, until the 15 min fraction weight was below 0.5 g. The incensole is a viscous liquid so the separator temperature was increased to 45° C. to allow it to be drained without retention in the separator. When complete, the $CO_2$ pump was switched off, the back pressure was released and the separator was washed out with industrial methylated spirits (IMS) to ensure no incensole was left that would contaminate the next fraction. Once dry, the trap and separator were reassembled.

The next extraction was carried out with supercritical $CO_2$ with ethanol as co-solvent. The co-solvent pump was primed, the valve was then slowly opened to allow pressure to equilibrate with sc$CO_2$ flow. ABPR setting was slowly reduced to 300 bar and the extractor temperature decreased to 40° C. Once temperature and pressure had been reached, $CO_2$ flow was turned on at a flow rate of 9 g/minute and once pressure had been reached, the separator was adjusted to 15 bar back pressure and the co-solvent pump was opened at a flow rate of 1 g/minute ethanol corresponding to 10 vol %. The samples were collected every hour for 3 hours but the separator and trap were drained every 30 minutes into the same flask. After 3 hours the co-solvent pump was turned off but the $CO_2$ pump was run for another 30 minutes adding this to the last fraction.

At the end of the operation the plant was thoroughly cleaned as follows: the plant was depressurised and all heaters turned off. The contents of extractor were emptied into a plastic beaker and the extractor was cleaned with a vacuum cleaner. The extractor, pipework, and separator were cleaned with IMS, and allowed to dry. The plant was then reassembled.

Identification of the compounds was based on calculated Kovats retention index, comparison with library mass spectra (NIST and Adams) and comparison with standard components. The use of a VF-5 (equivalent to DB-5 or HP-5) column allowed more accurate correlation with the extensive Adams database Example 1

The trial was carried out with *Boswellia carteri* resin. 60 g of resin was loaded into the extractor and sequentially extracted as described above. FIG. 1 shows the composition of this resin and the proportions of the fractions present.

Liquid Carbon Dioxide Fraction.

Figure 2:
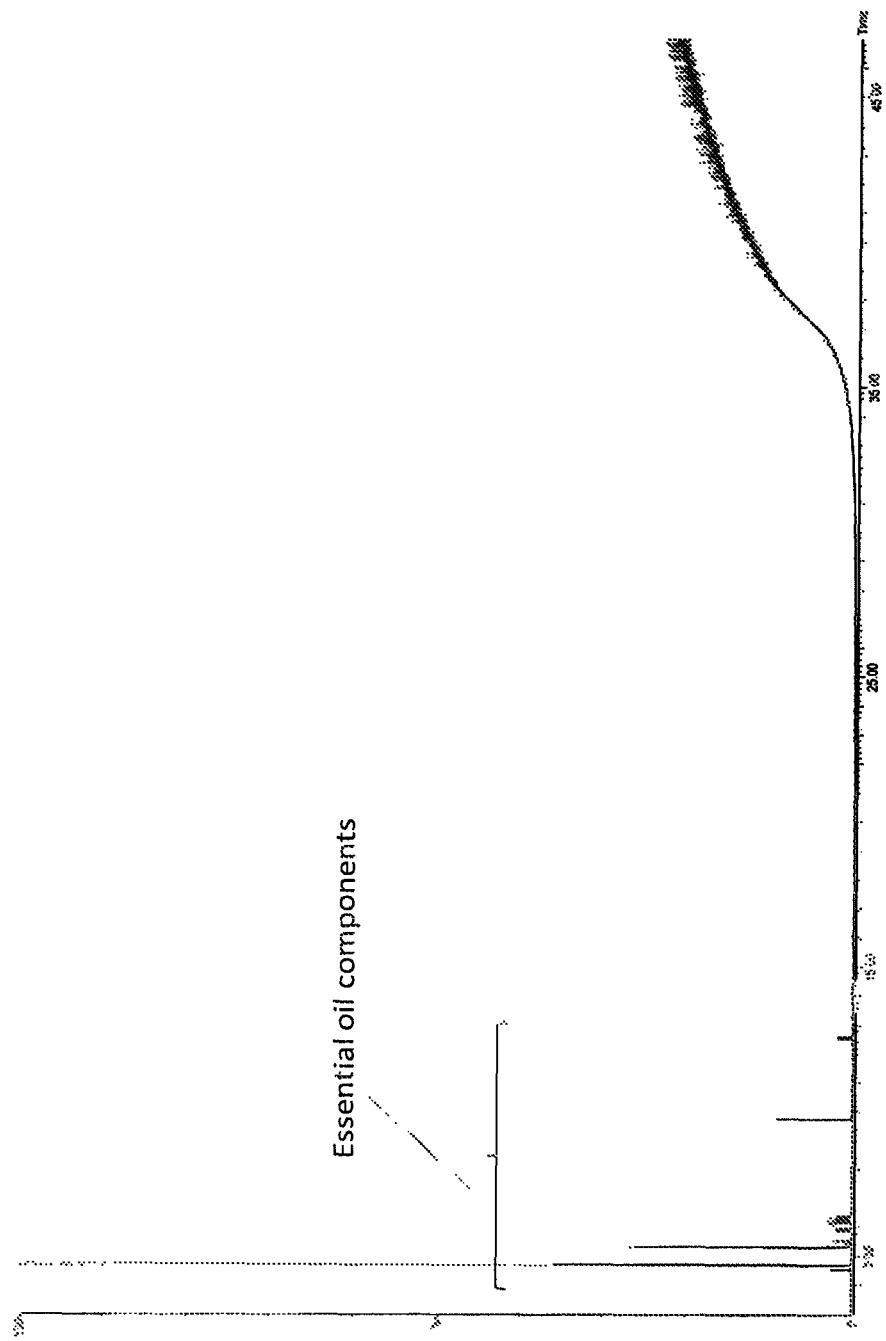
FIG. 2 represents the gas chromatogram of the essential oil fraction

FIG. 2 shows the chromatogram of this fraction indicating the main components are mono and sesquiterpene hydrocarbons. The yield of this fraction was 2.79 g from 60 g resin (4.65%). The oil was characteristic of frankincense but with a richer and longer lasting aroma compared to distilled oil.

Supercritical Carbon Dioxide Fraction

Figure 3:
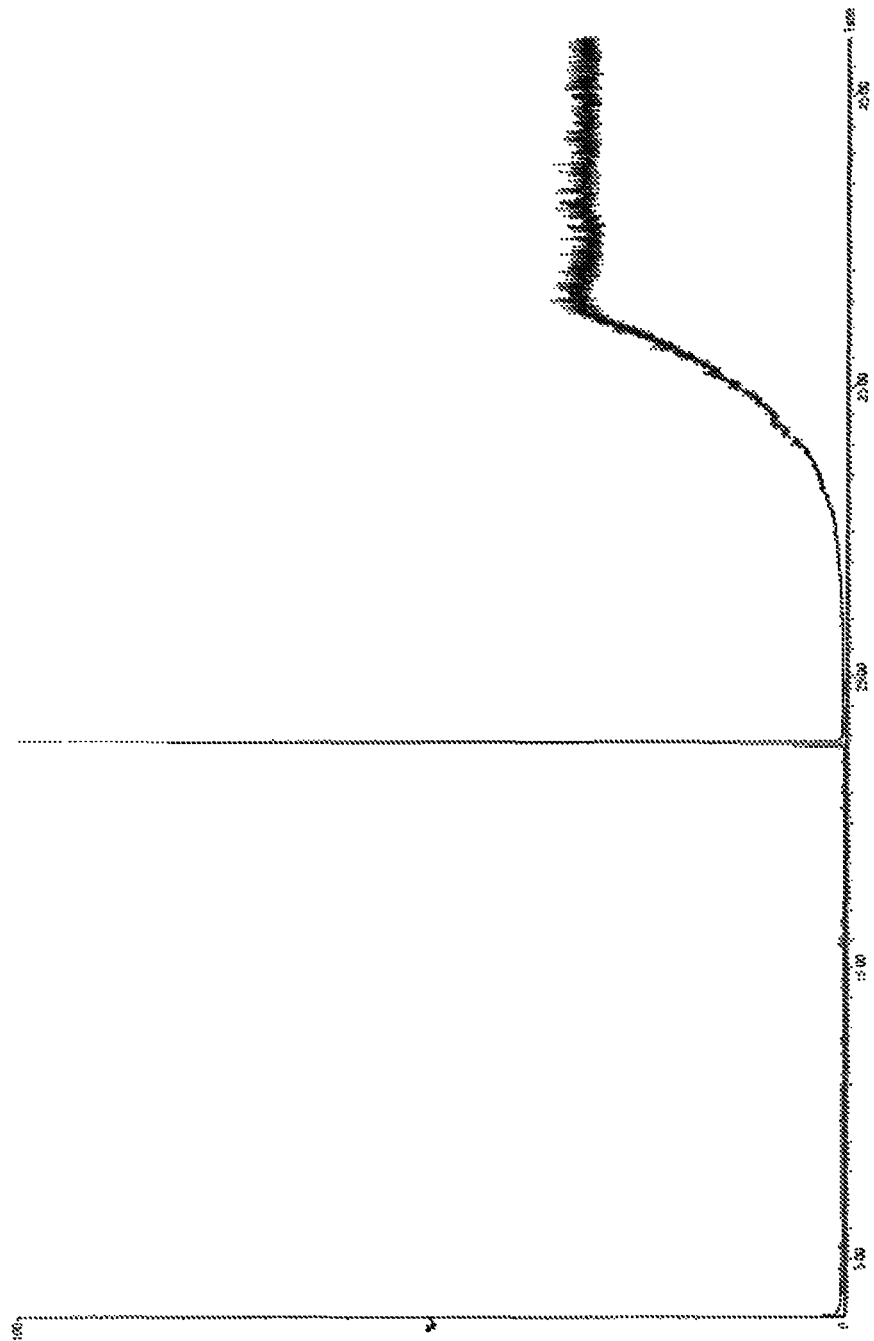
FIG. 3 represents the gas chromatogram of the incensole fraction

The supercritical $CO_2$ fraction is almost entirely composed of incensole and the chromatogram of this fraction is shown in FIG. 3. This fraction is a clear and very viscous oil almost devoid of any characteristic frankincense aroma confirming the complete separation from the essential oil fraction obtained by liquid $CO_2$ extraction. The yield of this fraction was 11.4 g from 60 g resin (18.99%).

Supercritical Carbon Dioxide with 10 Vol % Ethanol Fraction

Figure 4:
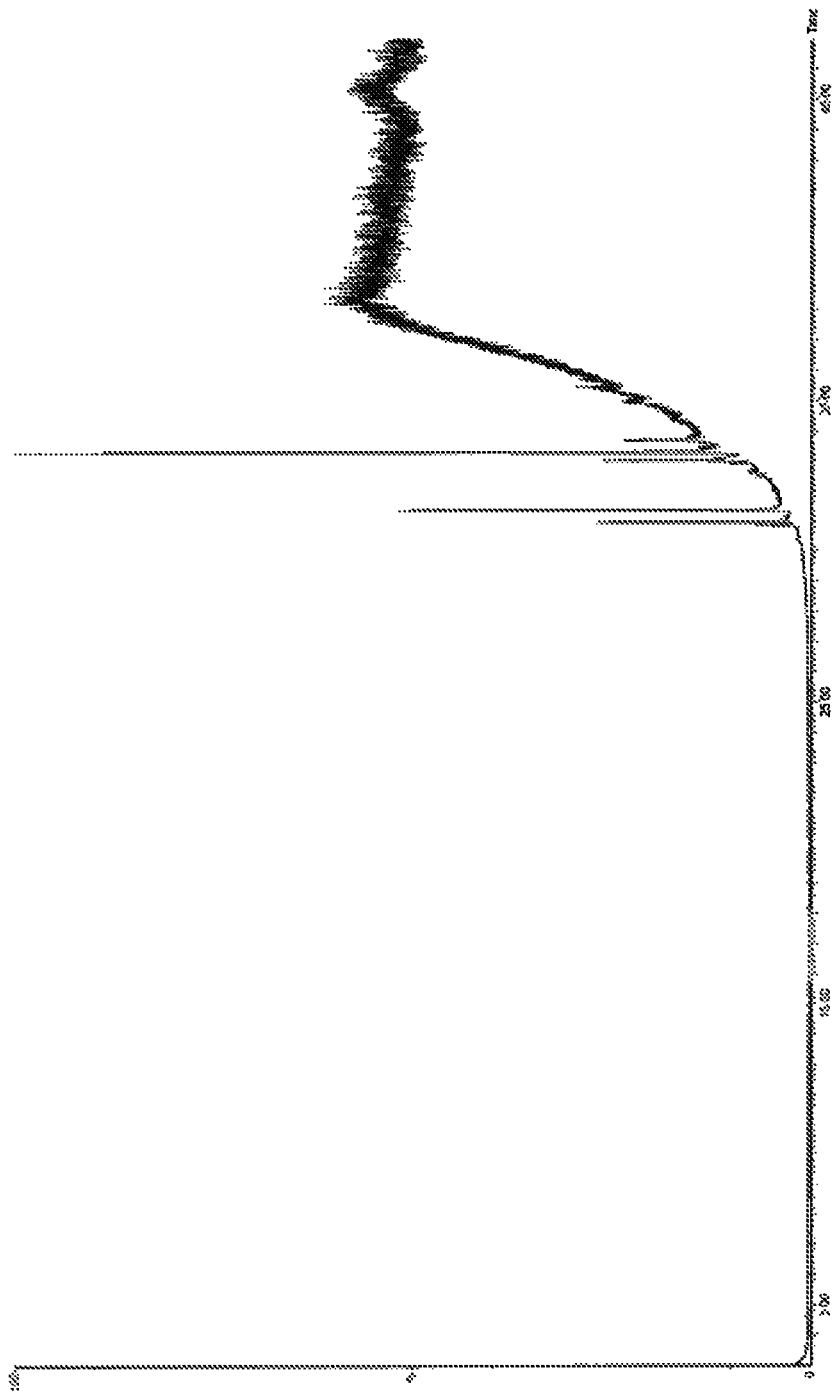
FIG. 4 represents the gas chromatogram of the boswellic acid fraction

The supercritical $CO_2$ fraction with 10% ethanol added was distinctly different. The fraction is an odourless semi-solid amber resin composed of a complex mixture of boswellic acids characteristic of *Boswellia carteri*. FIG. 4 shows the chromatogram of this fraction and demonstrates that it is almost devoid of incensole indicating a clear fractionation from the incensole. The yield of this fraction was 29.07 g (48.45%).

Extraction Residue

Analysis of the residue showed that the removal of the essential oil, incensole and boswellic acids was complete. The weight was 16.5 g giving a 99.6% mass balance.

Example 2

Figure 5:
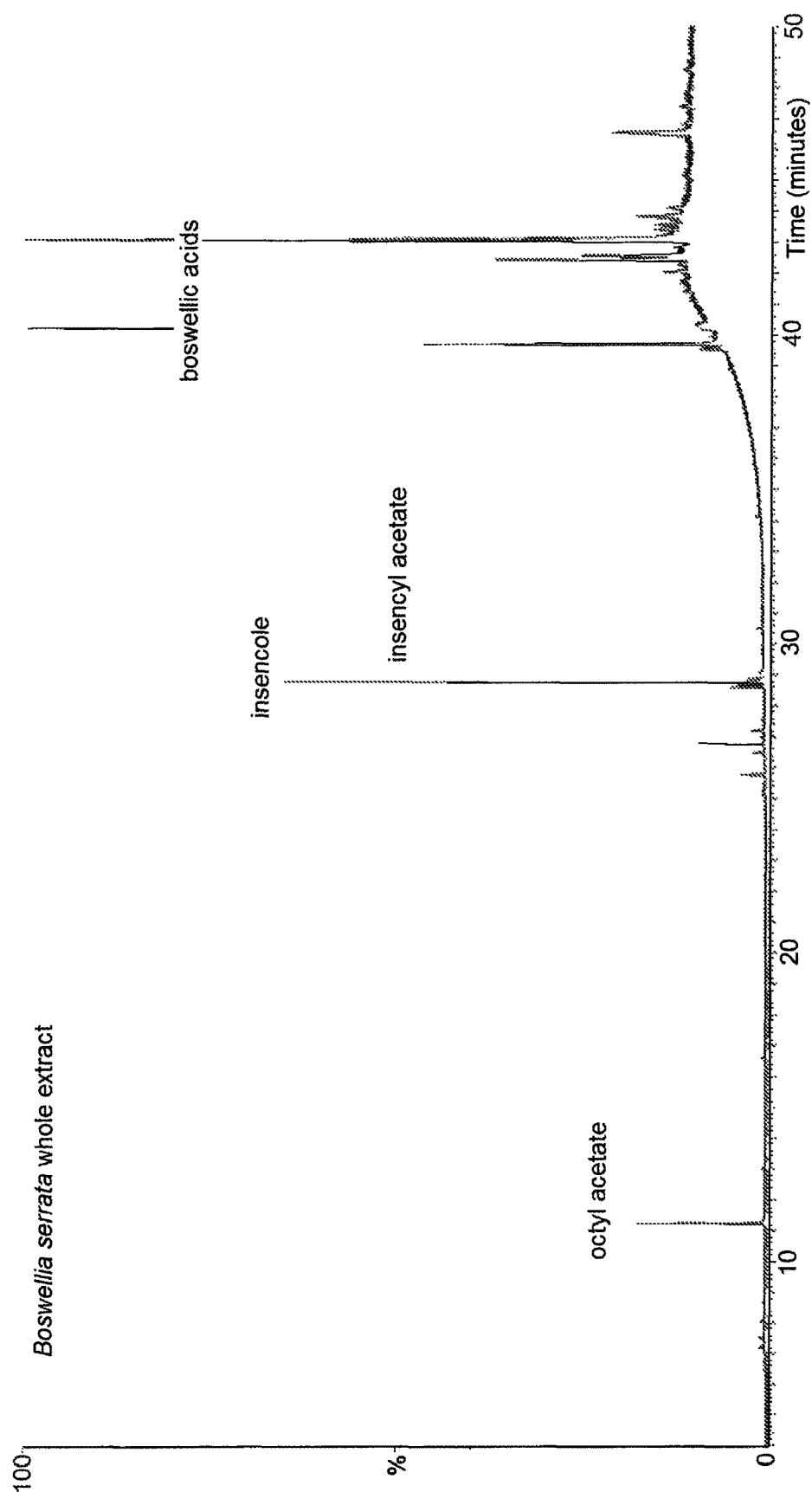
FIG. 5 represents the gas chromatogram of a whole extract from *Boswellia serrata* with the main components indicated

The trial was carried out with *Boswellia serrata* resin. 60 g of resin was loaded into the extractor and sequentially extracted as described above except that the first step of extraction was carried out using low pressure (85 bar/35° C.) supercritical $CO_2$ instead of liquid $CO_2$. FIG. 5 shows the composition of this resin and the proportions of the fractions present.

Low Pressure Supercritical Carbon Dioxide Fraction.

Figure 6:
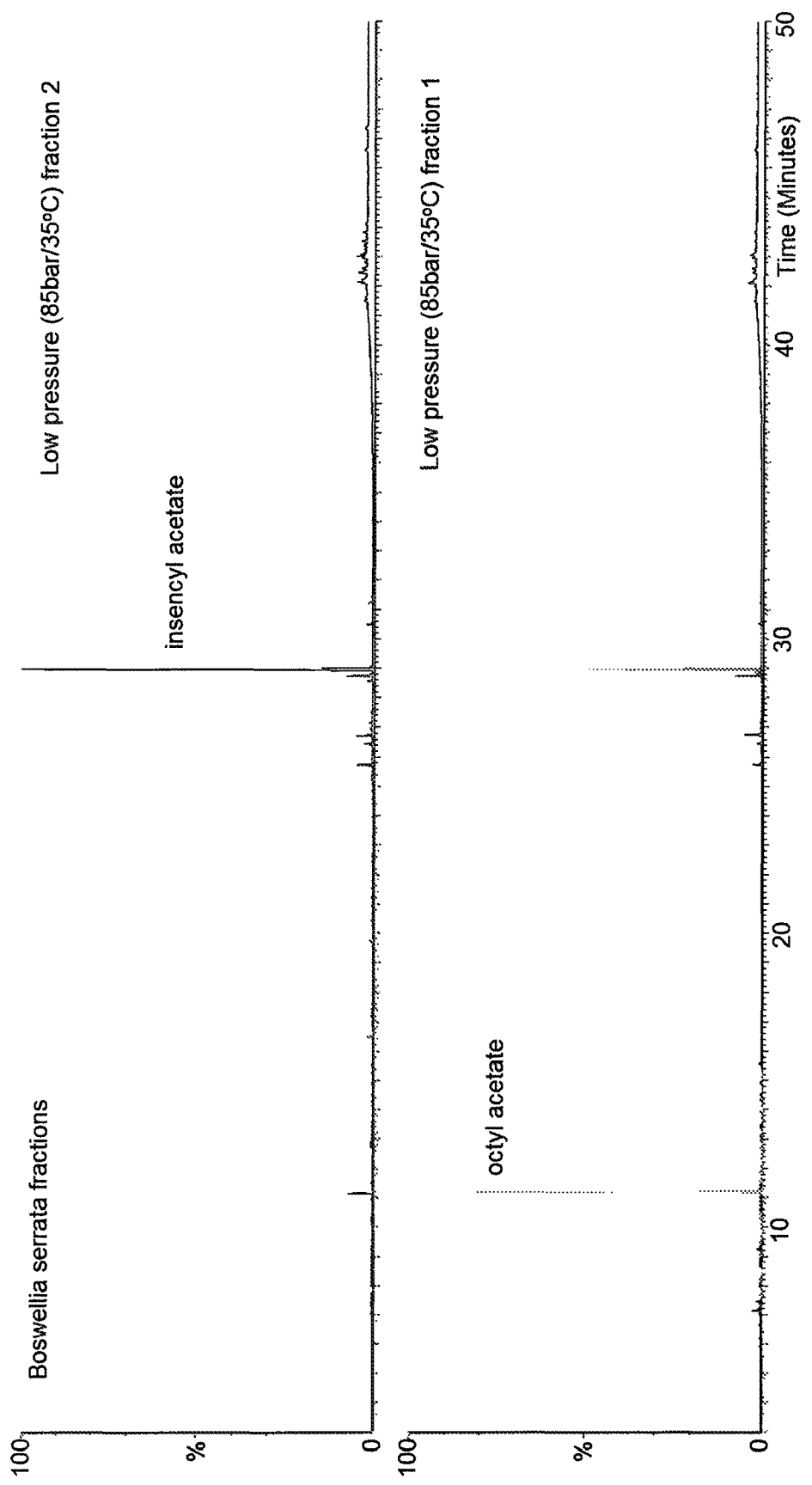
FIG. 6 represents the gas chromatogram of the *Boswellia serrata* ester fractions

In this example it is the intention to obtain a fraction rich in incensyl acetate. FIG. 6 shows the chromatogram of this fraction collected in the first hour (fraction 1) and the second hour (fraction 2), indicating the main ester components. The yield of fraction 1 was 0.75 g from 60 g resin (1.25%) and the yield from fraction 2 was 1.1 g from 60 g resin (1.83%). Fraction 1 is predominantly octyl acetate and could be separated from the incensyl acetate by a simple distillation step, fraction two is mostly incensyl acetate.

Supercritical Carbon Dioxide Fraction

The supercritical $CO_2$ fraction is composed of a mixture of incensole and incensyl acetate, the yield of this fraction was 2.43 g from 60 g resin (4.05%).

Supercritical Carbon Dioxide with 10 Vol % Ethanol Fraction

The supercritical $CO_2$ fraction with 10% ethanol added produced a fraction that was an odourless semi-solid dark amber resin composed of a complex mixture of boswellic acids characteristic of *Boswellia serrata*. The yield of this fraction was 31.55 g (48.45%).

The invention claimed is:

1. A method for sequentially extracting essential oil, incensole derivatives and boswellic acid from frankincense resin, said method comprising:
   a) grinding the frankincense resin;
   b) separating a first fraction of essential oil with liquid carbon dioxide at a first temperature ranging between 0° C. and 30° C. and a first pressure ranging between 40 bars and 73.8 bars or with mild supercritical carbon dioxide, and with a first flow rate ranging between 10 g and 400 g/kg ground material/min until no further essential oil can be recovered or the extract yield falls below 0.1% of starting mass per hour;
   c) retrieving essential oil from the separator;
   d) separating a second fraction of incensole derivatives with supercritical carbon dioxide at a second temperature ranging between 31° C. and 100° C. and a second pressure of at least 72.8 bars and a second flow rate ranging between 10 g and 400 g/kg ground material/min until no further incensole or its derivatives can be recovered or the extract yield falls below 0.1% of starting mass per hour;
   e) retrieving incensole derivatives from the separator;
   f) optionally, continuing the separation process with supercritical carbon dioxide at other sets of increasing temperature and/or pressure until further desired fractions are separated;
   g) separating a further fraction of boswellic acid with supercritical carbon dioxide at a temperature of at least 31° C. and a pressure of at least 72.8 bars and a flow rate ranging between 10 g and 400 g/kg ground material/min using a co-solvent at a level ranging between 0.05 vol % and 50.0 vol % of the $CO_2$ flowrate until complete separation of boswellic acids is achieved or it is determined that no further materials can be extracted or the extract yield falls below 0.1% of starting mass per hour;
   h) retrieving boswellic acid from the separator and removing the co-solvent by evaporation or distillation;
   i) optionally, continuing the separation process with supercritical carbon dioxide at another set of temperature and pressure and co-solvent until all desired fractions are separated; and
   j) retrieving the remaining unseparated residues.

2. The method of claim 1 wherein the starting frankincense material is obtained from *Boswellia* species selected from *B. ameero, B. boranensis, B. bricchettii, B. bullata, B. carteri, B. chariensis, B. dalzielii, B. dioscoridis, B. elegans, B. elongata, B. frereana, B. globosa, B. hildebrandtii, B. holstii, B. madagascariensis, B. microphylla, B. multifoliolata, B. nana, B. neglecta, B. occidentalis, B. ogadensis, B. ovalifoliolata, B. papyrifera, B. pirottae, B. popoviana, B. rivae, B. sacra, B. serrata* and *B. socotrana.*

3. The method of claim 1 wherein the grinding process is carried out with a screen ranging between 3 and 5 mm.

4. The method of claim 1 wherein during extraction step g), the co-solvent is collected and analysed by direct injection into liquid chromatography-mass spectroscopy until the extract yield falls below 0.1% of starting mass per hour.

5. The method of claim 1 wherein in step b), the temperature ranges between 5 and 20° C., the pressure ranges between 60 and 70 bars and the flow rate ranges between 50 and 100 g/kg ground material/min.

6. The method of claim 1 wherein in step d), the temperature ranges 30 and 50° C., the pressure ranges between 100 and 400 bars and the flow rate ranges between 50 and 100 g/kg ground material/min.

7. The method of claim 1 wherein in step g) the co-solvent is added at a level ranging between 5 and 15 vol % of the $CO_2$ flow rate.

8. The method of claim 2 wherein the grinding process is carried out with a screen ranging between 3 and 5 mm.

* * * * *